United States Patent
Namuduri et al.

(10) Patent No.: US 12,451,538 B2
(45) Date of Patent: Oct. 21, 2025

(54) CLOSED LOOP THERMAL CONTROL AND ESTIMATION OF A PARAMETER OF A BATTERY ASSEMBLY

(71) Applicant: GM GLOBAL TECHNOLOGY OPERATIONS LLC, Detroit, MI (US)

(72) Inventors: Chandra S. Namuduri, Troy, MI (US); Neeraj S. Shidore, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 795 days.

(21) Appl. No.: 17/735,329

(22) Filed: May 3, 2022

(65) Prior Publication Data

US 2023/0361377 A1     Nov. 9, 2023

(51) Int. Cl.
*H01M 10/637* (2014.01)
*H01M 10/42* (2006.01)
(Continued)

(52) U.S. Cl.
CPC ..... *H01M 10/637* (2015.04); *H01M 10/4264* (2013.01); *H01M 10/48* (2013.01); *H01M 10/615* (2015.04); *H01M 10/625* (2015.04); *H01M 10/633* (2015.04); *H01M 2010/4271* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2015/0253204 A1* | 9/2015 | Hebiguchi | H01M 10/486 324/430 |
| 2015/0303533 A1* | 10/2015 | Osaka | G01R 31/367 429/90 |

(Continued)

OTHER PUBLICATIONS

Ji et al., Heating strategies for Li-ion batteries operated from subzero temperatures, Electrochimica Acta, vol. 107, 2013, pp. 664-674, ISSN 0013-4686, available at: https://www.sciencedirect.com/science/article/pii/S0013468613005707 (Year: 2013).*

(Continued)

*Primary Examiner* — Scott J. Chmielecki
(74) *Attorney, Agent, or Firm* — CANTOR COLBURN LLP

(57) ABSTRACT

A device for parameter estimation and thermal control of a battery assembly includes a thermal management module electrically connected to the battery assembly, the thermal management module including a circuit configured to generate an alternating current (AC) signal through the battery assembly. The device also includes a controller configured to estimate an internal temperature of the battery assembly based on a response of the circuit and the battery assembly to the AC signal, the AC signal including at least one pulse having a selected amplitude and a selected pulse width. The controller is configured to apply the AC signal to the battery assembly via the thermal management module, detect the response, calculate one or more response parameters based on the response, the one or more response parameters including a calculated resistance of the battery assembly, and estimate the internal temperature based on the calculated resistance.

20 Claims, 8 Drawing Sheets

(51) Int. Cl.
*H01M 10/48* (2006.01)
*H01M 10/615* (2014.01)
*H01M 10/625* (2014.01)
*H01M 10/633* (2014.01)

(56) References Cited

U.S. PATENT DOCUMENTS

| | | | | |
|---|---|---|---|---|
| 2015/0381060 | A1* | 12/2015 | Eng | H02M 3/3376 |
| | | | | 363/21.03 |
| 2016/0069963 | A1* | 3/2016 | Hebiguchi | G01R 31/389 |
| | | | | 324/430 |
| 2018/0279420 | A1* | 9/2018 | De Angelis | H05B 6/06 |
| 2019/0341638 | A1* | 11/2019 | Kawabuchi | H01M 8/04228 |
| 2019/0363636 | A1* | 11/2019 | Komma | H02M 3/33507 |
| 2020/0114784 | A1* | 4/2020 | Fisher | B60L 3/0023 |
| 2020/0361279 | A1* | 11/2020 | Tan | B60H 1/00321 |
| 2025/0167599 | A1* | 5/2025 | Homma | H02J 50/60 |

OTHER PUBLICATIONS

Ji et al., Heating strategies for Li-ion batteries operated from subzero temperatures</i>, Electrochimica Acta, vol. 107, 2013, pp. 664-674, ISSN 0013-4686, available at: https://www.sciencedirect.com/science/article/pii/S0013468613005707 (Year: 2013).*

Ji et al.; "Heating strategies for Li-ion batteries operated from subzerotemperatures"; Electrochimica Acta, vol. 107, Sep. 30, 2013, pp. 664-674.

Ruan et al.; "A rapid low-temperature internal heating strategy with optimalfrequency based on constant polarization voltage for lithium-ionbatteries"; Applied Energy, vol. 177, Sep. 1, 2016, pp. 771-782.

Salehi; "Improving Low Temperature Performance of Lithium Ion Batteries Through Mutual Pulse Heating"; The Pennsylvania State University, Thesis in Mechanical Engineering; 2014; 96 pages.

Zhu et al.; "Experimental investigations of an AC pulse heating method forvehicular high power lithium-ion batteries at subzero temperatures"; Journal of Power Sources, vol. 367, Nov. 1, 2017, pp. 145-157.

* cited by examiner

CLOSED LOOP THERMAL CONTROL AND ESTIMATION OF A PARAMETER OF A BATTERY ASSEMBLY

INTRODUCTION

The subject disclosure relates to thermal control of batteries.

Vehicles, including gasoline and diesel power vehicles, as well as electric and hybrid electric vehicles, feature battery storage for purposes such as powering electric motors, electronics and other vehicle subsystems. In some cases, managing thermal properties of battery storage systems can be a challenge. For example, charging and discharging of batteries can become limited in low temperature situations. Accordingly, it is desirable to provide a device or system that can provide thermal management capabilities in a variety of conditions.

SUMMARY

In one exemplary embodiment, a device for parameter estimation and thermal control of a battery assembly includes a thermal management module electrically connected to the battery assembly, the thermal management module including a circuit configured to generate an alternating current (AC) signal through the battery assembly. The device also includes a controller configured to estimate an internal temperature of the battery assembly based on a response of the circuit and the battery assembly to the AC signal, the AC signal including at least one pulse having a selected amplitude and a selected pulse width. The controller is configured to apply the AC signal to the battery assembly via the thermal management module, detect the response, calculate one or more response parameters based on the response, the one or more response parameters including a calculated resistance of the battery assembly, and estimate the internal temperature based on the calculated resistance.

In addition to one or more of the features described herein, the controller is configured to apply an AC current to the battery assembly to heat the battery assembly to a desired temperature, and control one or more parameters of the AC current based on the estimated internal temperature.

In addition to one or more of the features described herein, the circuit is a quasi-resonant circuit including an inductor, a capacitor and a half bridge switch configuration.

In addition to one or more of the features described herein, detecting the response includes measuring a voltage and a current as a function of time.

In addition to one or more of the features described herein, the AC signal includes a single current pulse.

In addition to one or more of the features described herein, the response includes a first peak having a first amplitude and defined by an initial rise in the current through the battery assembly, and a subsequent second peak having a second amplitude that is lower than the first amplitude.

In addition to one or more of the features described herein, the one or more response parameters include an inductance and a capacitance of the circuit and the battery assembly, and the internal temperature is based on the calculated resistance and a state of charge of the battery assembly.

In addition to one or more of the features described herein, the inductance is calculated based on the first amplitude, and the capacitance is calculated based on a time period between the first peak and the second peak.

In another exemplary embodiment, a method of estimating a parameter of a battery assembly and thermally managing the battery assembly includes applying an alternating current (AC) signal to the battery assembly via a thermal management module electrically connected to the battery assembly, the thermal management module including a circuit configured to generate the AC signal, the AC signal including at least one pulse having a selected amplitude and a selected pulse width. The method also includes detecting a response of the circuit and the battery assembly to the AC signal, calculating one or more response parameters, the one or more response parameters including a calculated resistance of the battery assembly, and estimating the internal temperature based on the calculated resistance.

In addition to one or more of the features described herein, the method includes applying an AC current to the battery assembly to heat the battery assembly to a desired temperature, and controlling one or more parameters of the AC current based on the estimated internal temperature.

In addition to one or more of the features described herein, the circuit is a quasi-resonant circuit including an inductor, a capacitor and a half bridge switch configuration.

In addition to one or more of the features described herein, detecting the response includes measuring a voltage and a current as a function of time.

In addition to one or more of the features described herein, the AC signal includes a single current pulse.

In addition to one or more of the features described herein, the response includes a first peak having a first amplitude and defined by an initial rise in the current through the battery assembly, and a subsequent second peak having a second amplitude that is lower than the first amplitude.

In addition to one or more of the features described herein, the one or more response parameters include an inductance and a capacitance of the circuit and the battery assembly, and the internal temperature is based on the calculated resistance and a state of charge of the battery assembly.

In addition to one or more of the features described herein, the inductance is calculated based on the first amplitude, and the capacitance is calculated based on a time period between the first peak and the second peak.

In yet another exemplary embodiment, a vehicle system includes a memory having computer readable instructions, and a processing device for executing the computer readable instructions, the computer readable instructions controlling the processing device to perform a method. The method includes applying an alternating current (AC) signal to the battery assembly via a thermal management module electrically connected to the battery assembly, the thermal management module including a circuit configured to generate the AC signal, the AC signal including at least one pulse having a selected amplitude and a selected pulse width. The method also includes detecting a response of the circuit and the battery assembly to the AC signal, calculating one or more response parameters, the one or more response parameters including a calculated resistance of the battery assembly, and estimating the internal temperature based on the calculated resistance.

In addition to one or more of the features described herein, the method further includes applying an AC current to the battery assembly to heat the battery assembly to a desired temperature, and controlling one or more parameters of the AC current based on the estimated internal temperature.

In addition to one or more of the features described herein, the response includes a first peak having a first amplitude and defined by an initial rise in the current through the battery assembly, and a subsequent second peak having a second amplitude that is lower than the first amplitude.

In addition to one or more of the features described herein, the one or more response parameters include an inductance and a capacitance of the circuit and the battery assembly, the internal temperature is based on the calculated resistance and a state of charge of the battery assembly, the inductance is calculated based on the first amplitude, and the capacitance is calculated based on a time period between the first peak and the second peak.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
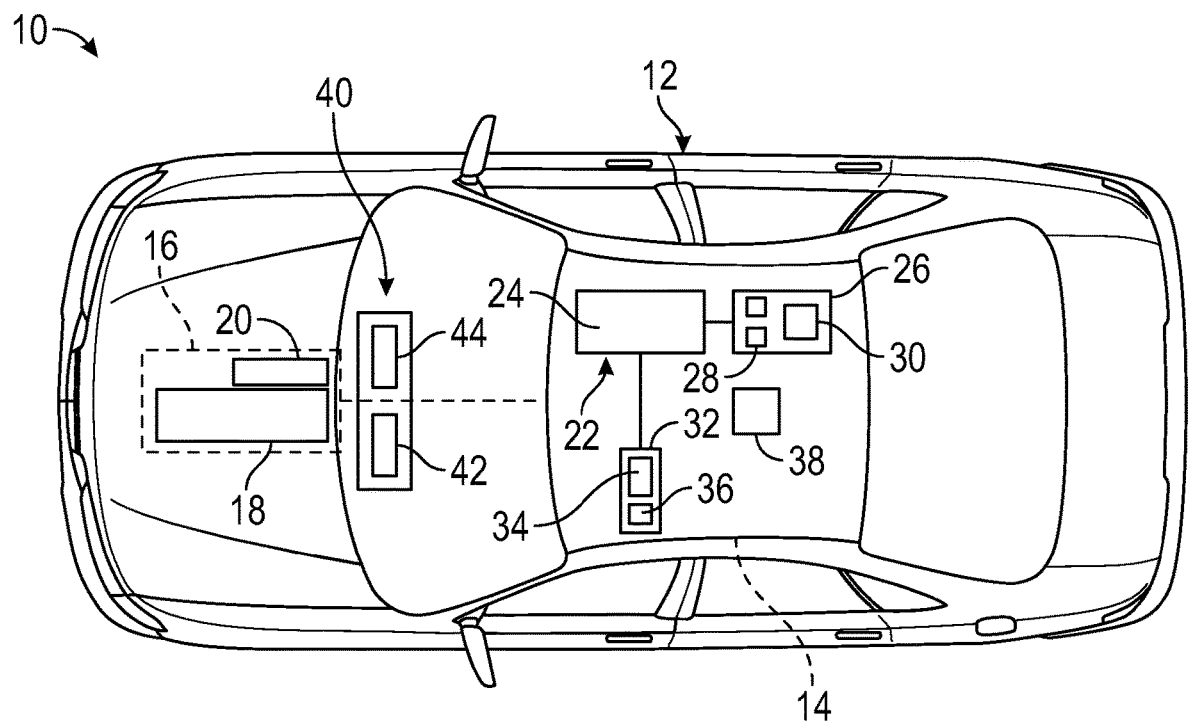
FIG. 1 is a top view of a motor vehicle including a battery assembly and a battery thermal management system, in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, methods, devices and systems are provided for thermal control of battery assemblies and battery systems, such as vehicle battery assemblies. An embodiment of a thermal management system includes a heating or thermal management module configured to apply current through a battery assembly for providing heat to the battery assembly (e.g., in low temperature conditions). The thermal management module, in an embodiment, includes an electrical circuit configured to provide closed loop heating control by applying alternating current through a battery assembly. The electrical circuit, in an embodiment, is a quasi-resonant circuit (QRC). The thermal management module and/or the electrical circuit may be a modular device that is added on to existing vehicle components, or the electrical circuit may be an existing circuit or incorporate one or more components of an existing circuit (e.g., circuitry of a vehicle propulsion system or propulsion assembly).

In accordance with an exemplary embodiment, the thermal management module is configured to estimate an internal temperature of a battery assembly (e.g., a battery module or battery pack). In an embodiment, the thermal management module determines internal temperature by applying one or more current pulses and measuring a response of the circuit. Based on the response, an inductance, capacitance and resistance of the battery assembly is estimated and the internal temperature of the battery assembly is calculated. The thermal management module may then be used to heat the battery by controlling the circuit (e.g., by adjusting duty cycle, peak current and/or frequency) to apply an alternating current (AC current) to the battery assembly.

Embodiments described herein present numerous advantages and technical effects. The embodiments provide for rapid and uniform heating of a battery assembly. The embodiments provide for internal temperature measurement, as well as additional thermal control or heating of battery systems, without the need for relatively complex heating systems. In addition, the embodiments can be realized using existing electronic components.

The embodiments are not limited to use with any specific vehicle and may be applicable to various contexts. For example, embodiments may be used with automobiles, trucks, aircraft, construction equipment, farm equipment, automated factory equipment and/or any other device or system for which additional thermal control may be desired to facilitate a device or system's existing thermal control capabilities or features.

FIG. 1 shows an embodiment of a motor vehicle 10, which includes a vehicle body 12 defining, at least in part, an occupant compartment 14. The vehicle body 12 also supports various vehicle subsystems including a propulsion assembly 16, and other subsystems to support functions of the propulsion assembly 16 and other vehicle components, such as a braking subsystem, a suspension system, a steering subsystem, a fuel injection subsystem, an exhaust subsystem and others.

The vehicle may be a combustion engine vehicle, an electrically powered vehicle (EV) or a hybrid vehicle. In an example, the vehicle 10 is a hybrid vehicle that includes a combustion engine assembly 18 and an electric motor assembly 20.

The vehicle 10 includes a battery assembly 22, which may be electrically connected to the motor assembly 20 and/or other components, such as vehicle electronics. In an embodiment, the battery assembly 22 is configured as a rechargeable energy storage system (RESS), and includes a high voltage battery pack 24 and a control unit 26. The control unit 26 includes sensors 28 and a controller 30. The controller 30 includes components such as a processor, memory, an interface, a bus and/or other suitable components.

The vehicle 10 also includes a thermal management system that includes a thermal management module 32 for regulating (cooling and/or heating) the temperature of the battery assembly 22. In an embodiment, the thermal management module 32 is configured to heat the battery assembly 22 during warm-up or otherwise as needed.

The thermal management module 32 includes a thermal management circuit 34 and may also include a controller 36. It is noted that the module 32 may use any suitable processing device or unit as a controller. For example, instead of the controller 36 (or in conjunction with the controller 36), another processing device may be used to control the circuit 34, such as the RESS controller 30 or an electronic control unit (ECU) 38.

The thermal management system is not limited to the configuration of FIG. 1. For example, all or part of the circuit 34 may include existing vehicle components, such as inverter switching devices and a capacitor in (or connected to) the propulsion assembly 36.

The vehicle 10 includes various processing devices and/or units for controlling aspects of the vehicle. For example, the ECU 38 is included to control various vehicle subsystems. The vehicle 10 also includes a computer system 40 that includes one or more processing devices 42 and a user interface 44. The various processing devices and units may communicate with one another via a communication device or system, such as a controller area network (CAN) or transmission control protocol (TCP) bus.

Figure 2:
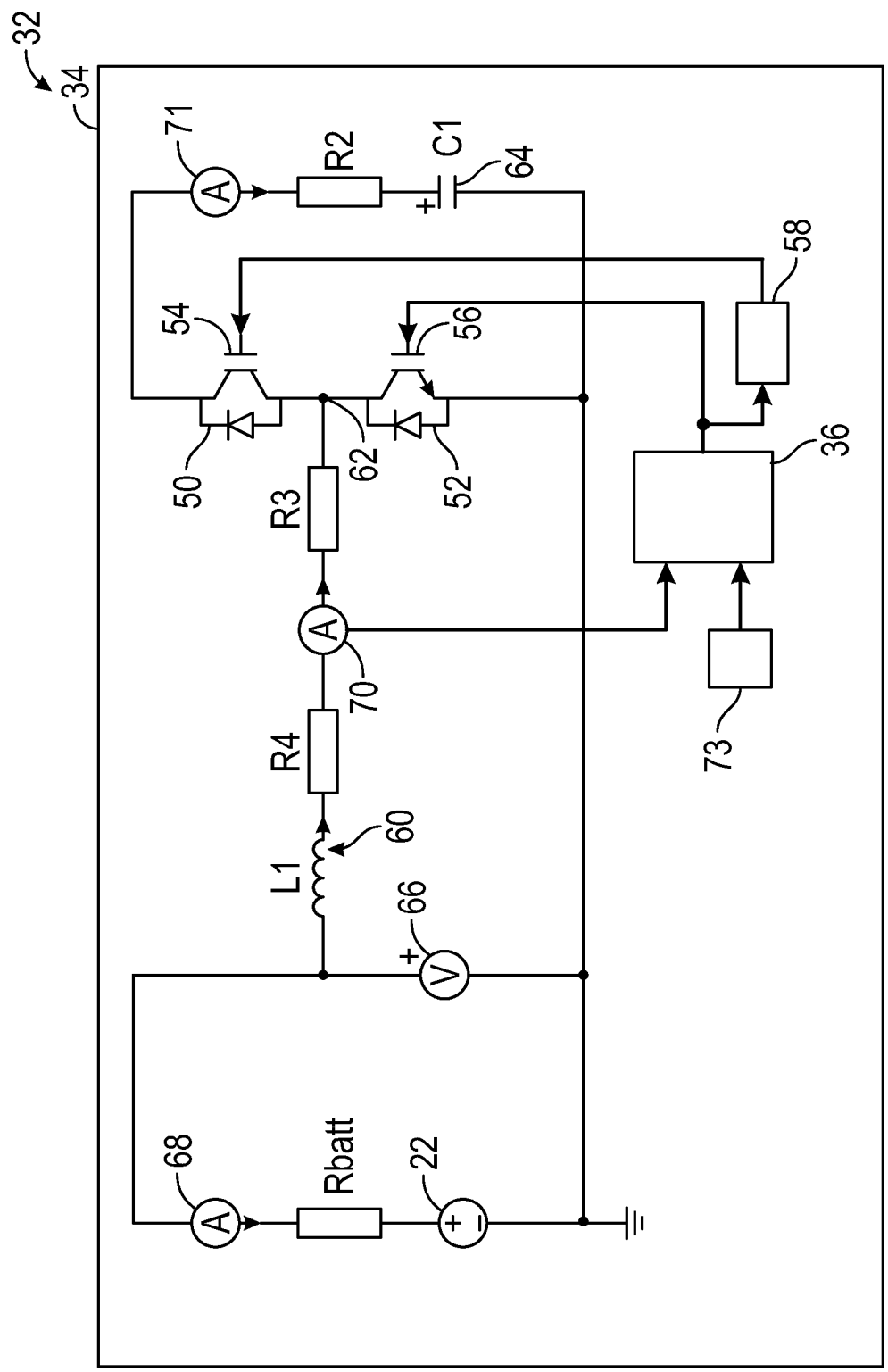
FIG. 2 depicts components of a thermal management device or module, in accordance with an exemplary embodiment.

FIG. 2 depicts an embodiment of the thermal management module 32, in which the circuit 34 is a quasi-resonant circuit (QRC) 34. The QRC 34 may be a dedicated circuit of the thermal management module 32, but is not so limited. For example, the QRC 34 can include any leg (half bridge) of a three-phase inverter, which is used to drive a traction motor of a vehicle (e.g., the motor 20 of the vehicle 10). Multiple such inverters can exist in an electric or hybrid vehicle; one or more legs of any existing inverter can be used to form the QRC 34.

The QRC 34 is controlled by the controller 36 to apply AC current through the battery assembly 22 (represented as a resistance $R_{batt}$) in order to uniformly heat the battery assembly 22. The battery assembly 22 may be a single battery or battery module, a plurality of batteries, a battery pack or other battery configuration. The QRC 34 may also be controlled to measure an internal temperature of the battery assembly 22 as discussed herein.

The QRC 34 includes a first switch 50 and a second switch 52 connected to form a half-bridge. The first switch 50 includes a first terminal 54 connected to the controller 36, and the second switch 52 includes a second terminal 56 connected to the controller 36 via an inverter 58. Any suitable device may be employed as a switch. For example, the switches 50 and 52 can include solid state relays and transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (SiC) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

The QRC 34 also includes an inductor 60 having an inductance $L_1$, which is connected between a node 62 (HB1) of the half bridge and a positive terminal of the battery assembly 22. Resistances between the inductor 60 and the node 62 are represented as resistances R3 and R4. The inductor 60 may be a dedicated inductor, an existing inductor in the vehicle 10, intrinsic internal battery inductance, and/or intrinsic inductance in couplings between the battery assembly 22 and the half bridge (e.g., cable and/or busbar). A capacitor 64 (having a capacitance $C_1$) is connected to the half bridge. The capacitor 64 may be a dedicated capacitor or a DC link capacitor of a three phase inverter.

The QRC 34 is also connected to various sensors for monitoring parameters thereof. For example, a voltmeter 66 is provided to measure the battery voltage V, and an ammeter 68 is provided to measure the battery current ($I_{batt}$). Other sensors may include an ammeter 70 for measuring current ($I_{L1}$) through the inductor 60 and an ammeter 71 for measuring current across the capacitor 64. The resistance between the ammeter 71 and the capacitor 64 is represented as a resistance R2. One or more of the sensors is configured to send measurements to the controller 36 to facilitate operation of the QRC 34 to provide heating and/or to estimate battery temperatures.

In an embodiment, the thermal management module 32 and the QRC 34 are configured to be activated based on a temperature of the battery assembly 22 being below a selected threshold. For example, the module 32 is automatically triggered to heat the battery assembly 22 in response to an internal temperature measurement of the battery assembly 22.

The QRC 34 operates to heat the battery assembly 22 by putting the switch 52 into an ON state or closed state, and putting the switch 50 into an OFF state or open state for a period of time to allow the battery assembly 22 to source current through the inductor 60. Thereafter, the switch 52 is opened (put into an OFF state) and the switch 50 is closed (put into an ON state) to couple the inductor 60 and the capacitor 64 and place the series LC combination across the battery assembly 22. The switch 52 is left in the OFF state and the switch 50 is left in the ON state long enough for the QRC 34 to oscillate.

To heat the battery assembly 22, the controller 36 provides a control signal, such as a pulse width modulation (PWM) signal, having a selected or preset period between pulses and pulse width. The control signal is adjusted based on a desired amount of heating by adjusting signal parameters such as pulse width, duty cycle (D), frequency, signal amplitude and others.

The controller 36 receives a reference current ($I_{Ref}$) via a reference signal 73, and continuously or periodically measures a sensed current value ($I_{sense}$) from the ammeter 70. In an embodiment, the reference current is a peak current indication that specifies a peak or maximum current ($I_{pk}$) that can be applied. The controller 36 can control the PWM signal and control switching based on a comparison between $I_{sense}$ and $I_{ref}$.

Figure 3:
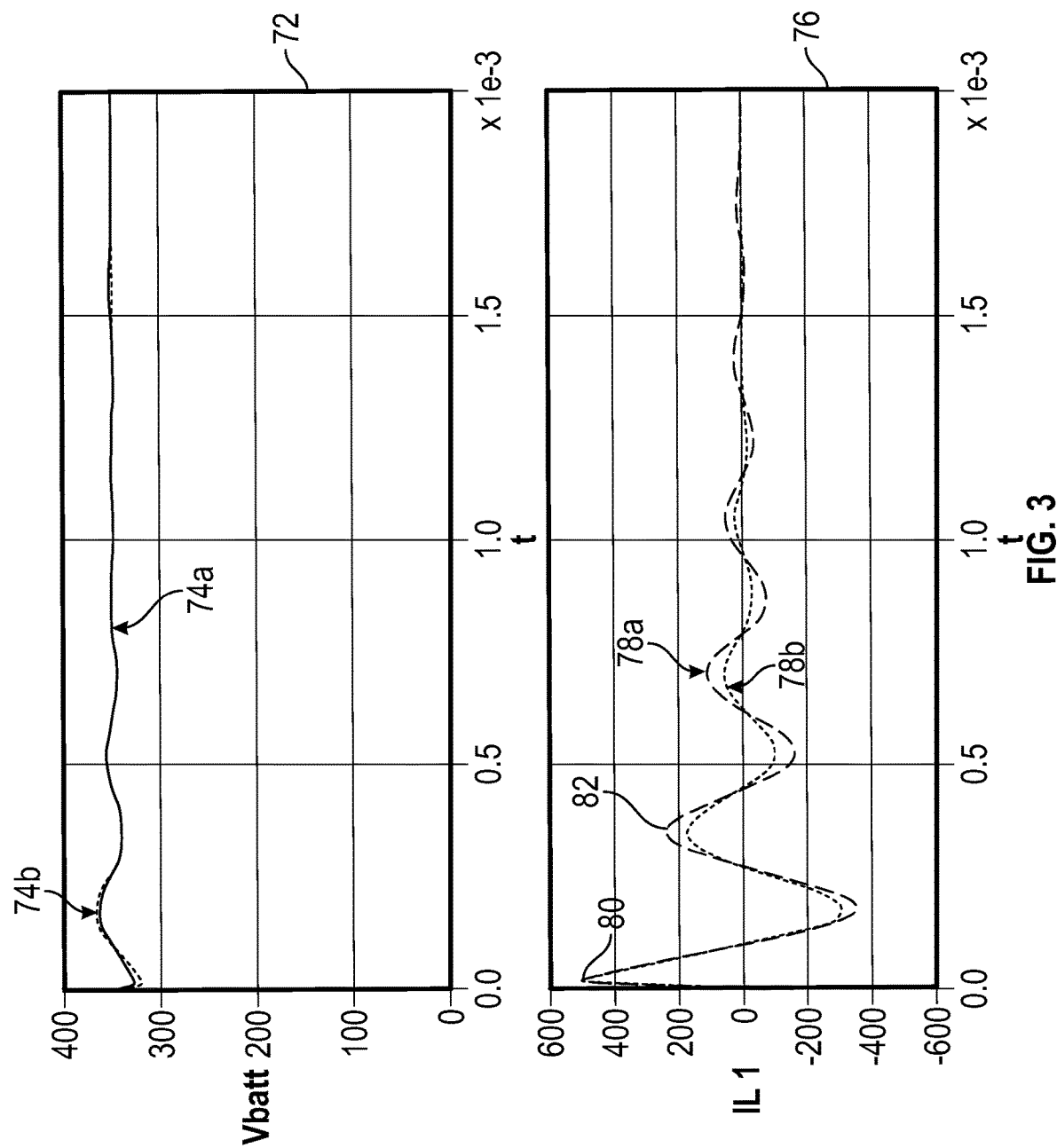
FIG. 3 depicts graphs representing voltage responses and current responses of the thermal management device of FIG. 2 to an applied current signal.

FIG. 3 depicts an example of a response of the QRC 34 to an AC signal. The AC signal, in this example, includes a single pulse having a selected period and pulse width that is applied to the QRC 34. The response in this example is measured for a battery resistance Rb of 0.04 Ohms (Rb=0.04Ω), and for a battery resistance of 0.058 Ohms (Rb=0.058Ω). The response includes a voltage response shown in a first graph 72, which represents the battery voltage $V_{batt}$ in Volts (V) as a function of time t (in seconds). The battery voltage is shown by a voltage curve 74a for Rb=0.04Ω, and a voltage curve 74b for Rb=0.058Ω. As shown, the voltage varies slightly over time, initially rising and then oscillating.

A current response is shown in a second graph 76 of current $I_{L1}$ as a function of time. The current response is represented by a current curve 78a for Rb=0.04Ω, and a current curve 78b for Rb=0.058Ω. The current rises quickly at an initial time to (the time when the switch is turned ON), and oscillates thereafter. The current oscillation decays over time as shown. For example, the curve 78a has an initial or first peak 80, a second peak 82, and a number of successive peaks having successively smaller amplitudes. The curve 78b similarly oscillates with a decaying oscillation. Generally, higher resistances correspond to lower peak amplitudes and slower decay, and lower resistances correspond to higher peak amplitudes and more rapid decay.

In an embodiment, the thermal management module 32 is configured to estimate an internal temperature of the battery assembly 22 by applying an AC signal as a current pulse or pulses to the QRC 34 and the battery 22, and analyzing the response of the QRC 34 and the battery assembly 22. An internal temperature measurement may be performed at any time (e.g., at vehicle startup, in response to a user request, etc.) to determine whether heating should be applied. In addition, the internal temperature measurement may be performed during a heating process or heating cycle. For example, during a heating cycle, a processing device such as the controller 36 periodically analyzes a pulse response to monitor the internal temperature.

Figure 5:
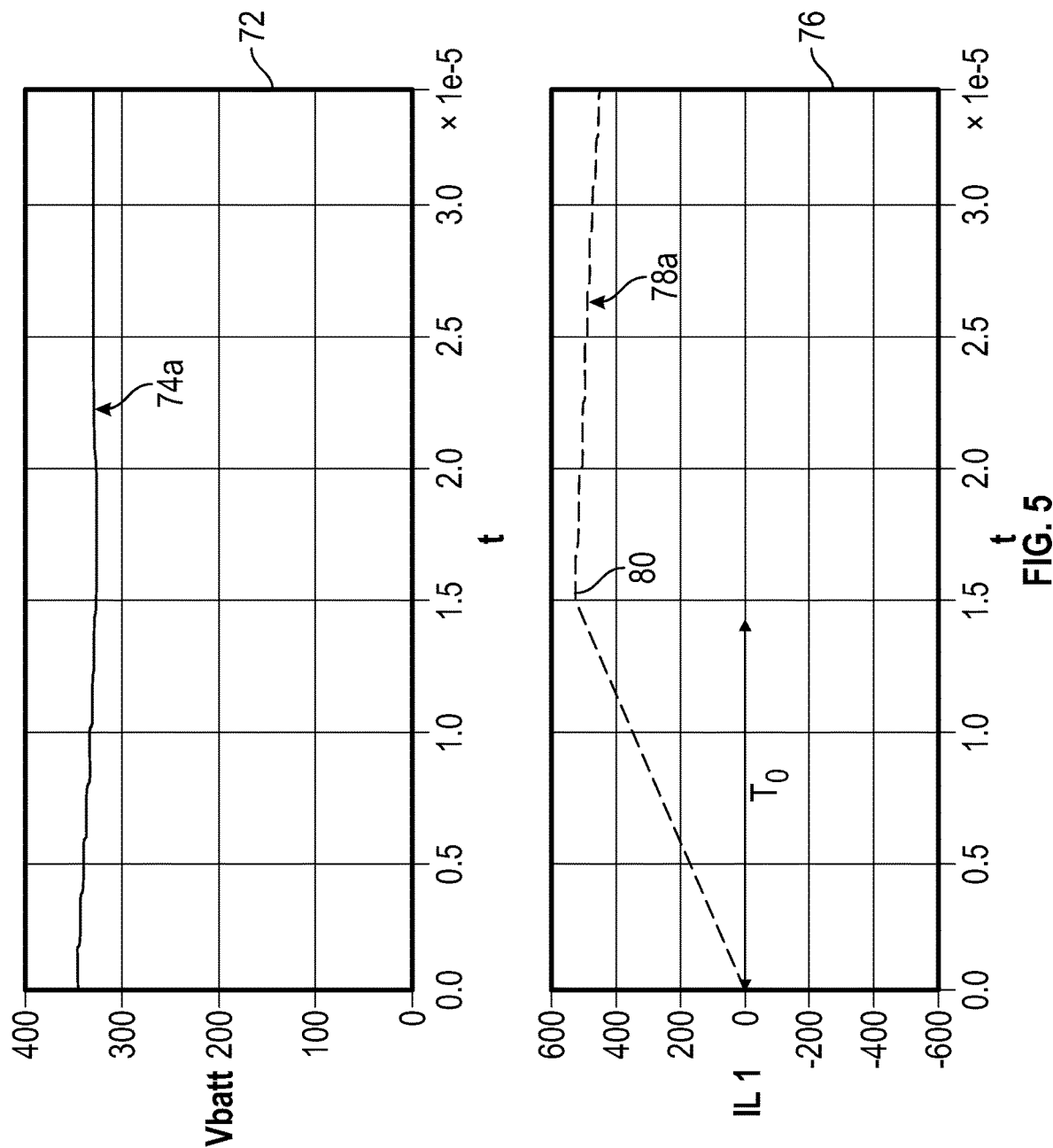
FIG. 5 depicts a portion of the voltage responses and the current responses of FIG. 3.

FIG. 5 illustrates embodiments of a method 90 of estimating an internal temperature of a battery assembly. Aspects of the method 90 may be performed by a processor or processors disposed in the vehicle 10 (e.g., the controller 36). It is noted the method 90 is not so limited and may be performed by any suitable processing device or system, or combination of processing devices. In addition, the method 90 is not limited to use with the vehicle 10, as the method 90 may be performed in conjunction with any suitable battery or battery system.

The method 90 includes a number of steps or stages represented by blocks 91-96. The method 90 is not limited to the number or order of steps therein, as some steps represented by blocks 91-96 may be performed in a different order than that described below, or fewer than all of the steps may be performed.

At block 91, the thermal management module 32 is operated to apply an AC signal to the QRC 34 and the battery assembly 22. The signal is applied, for example, via pulse width modulation (PWM) control signals supplied by the controller 36 (or other processing device). In an embodiment, the AC signal is applied as a single current pulse. It is noted that more than one pulse may be applied. The pulse has a selected amplitude and duration (pulse width).

For example, the AC signal is applied by placing the switch 50 in the OFF position (open) and placing the switch 52 in the ON position (closed) until the current reaches a selected amplitude (set point). The switch 52 is then placed in the OFF position and the switch 50 is placed in the ON position for an amount of time corresponding to the pulse width.

At block 92, a response of the QRC 34 and the battery assembly 22 is recorded for a time period that includes the pulse width duration and a subsequent period of time. The subsequent period may be selected so that the response is recorded until the response falls to zero, or so at least an initial peak and one or more subsequent peaks are recorded. The response may be in the form of measured voltage and current as a function of time. For example, the measured voltage is recorded over time and an average voltage or other suitable voltage value is estimated based on the recorded voltage. The measured current may be in the form of a response curve having an initial peak and one or more subsequent peaks.

At block 93, an inductance of the battery assembly 22 (e.g., the inductance $L_1$) is calculated based on the measured voltage and the measured current. In an embodiment, the inductance is calculated based on an amplitude of the initial peak and a rate of increase of the measured current from the initial time to (corresponding to the onset of the pulse) to the initial peak amplitude.

FIG. 5 depicts a portion of the voltage response curve 74a and the current response curve 78a. As shown, the measured current rises from zero at time $t_0$ to a maximum value at time $T_0$. The curve can be represented as a function of time t as follows:

$$i_L(t) = \left(\frac{V}{R}\right)\left[1 - e^{-Rt/L}\right]$$

$$\left[\frac{di_L}{dt}\right]_{t=0} = \left(\frac{V}{L}\right),$$

where V is the measured voltage, which may be calculated as an average voltage, R is the resistance of the battery assembly 22 and L is inductance (e.g., $L_1$). The inductance L may be calculated based on the following equation:

$$L = \left(\frac{V \cdot T_0}{I_0}\right),$$

where $I_0$ is the peak amplitude at time $T_0$.

Figure 4:
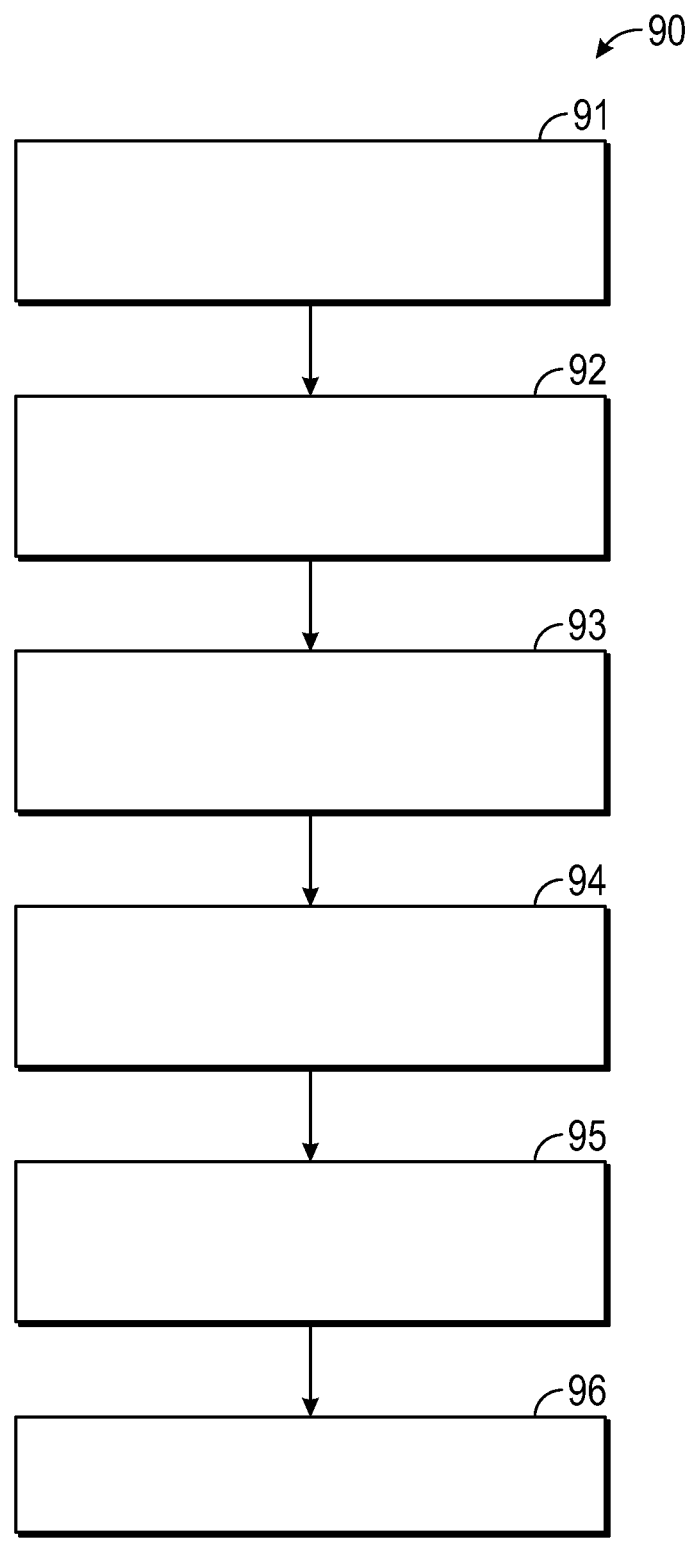
FIG. 4 is a flow diagram depicting aspects of a method of estimating an internal temperature of a battery assembly, in accordance with an exemplary embodiment.

Referring again to FIG. 4, at block 94, a capacitance C of the circuit 34 (e.g., capacitance $C_1$) is calculated based on the inductance and the measured current. In an embodiment, capacitance is calculated based on a time period $T_d$ between the initial peak and a first subsequent peak.

At block 95, the resistance R of the battery assembly 22 is calculated based on the response, e.g., based on the time period Td and amplitudes of peaks.

At block 96, an internal temperature of the battery assembly 22 is calculated based on the calculated resistance. For example, the calculated resistance and a state of charge (SOC) of the battery assembly 22 are used to determine the internal temperature using a temperature curve or other model. In an embodiment, a lookup table or other data structure may be maintained that correlates temperature values to values of resistance and SOC.

The method 90 may be performed during a heating process or heating cycle. For example, application of a signal pulse, recording the response and estimating temperature is performed periodically (e.g., every second) during the heating cycle.

Figure 6:
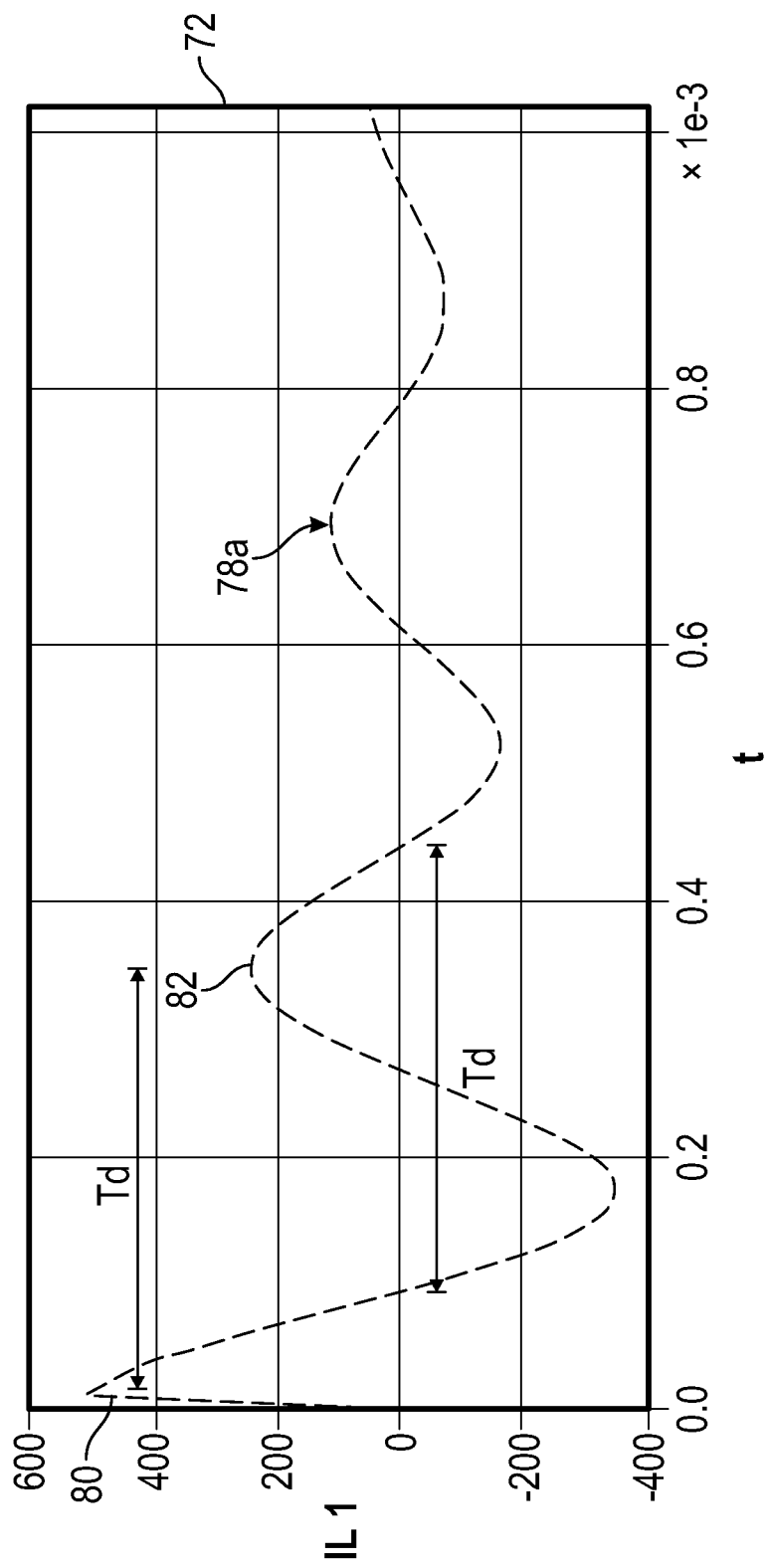
FIG. 6 depicts a portion of a current response of FIG. 3.

FIG. 6 depicts a portion of the current response curve 78a and illustrates aspects of capacitance and resistance calculations. As shown, the initial peak 80 is separated from the peak 82 by the time period $T_d$, which extends from a zero crossing of the peak 80 to a zero crossing of the peak 82. The peak 82 has a maximum or peak amplitude $I_1$. The curve 78a can be represented as a function of time t as follows:

$$i_L(t') = I_0 e^{-\alpha t'}\left(\cos\omega_d t' - \frac{\alpha}{\omega_d}\sin\omega_d t'\right), \text{ where: } I_1 = I_0 e^{-\alpha T_d},$$

$$\alpha = \left(\frac{R}{2L}\right), \text{ and } \omega_d = \left(\frac{2\pi}{T_d}\right) = \sqrt{\frac{1}{LC} - \frac{R^2}{4L^2}}.$$

t' corresponds to the time when the switch 50 is turned off (end of pulse) and the current begins to fall.

The capacitance C may be calculated as follows:

$$C \sim \left(\frac{T_d^2}{4\pi^2 L}\right),$$

and the resistance R may be calculated as follows:

$$R = \left(\frac{2L}{T_d}\right)\ln\left(\frac{I_0}{I_1}\right).$$

Figure 7:
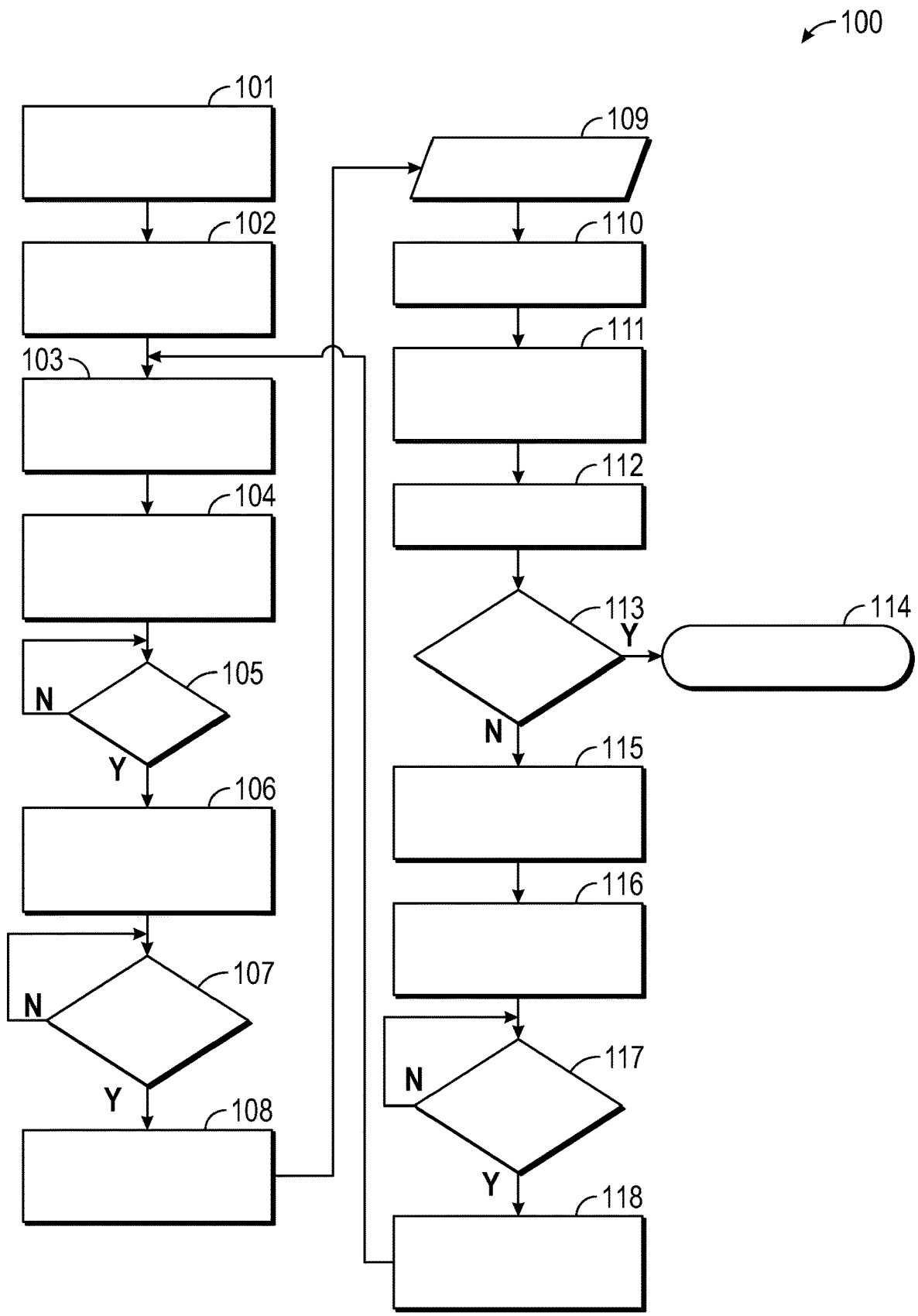
FIG. 7 is a flow diagram depicting aspects of a method of thermal control or management of a battery assembly, in accordance with an exemplary embodiment.

FIG. 7 illustrates embodiments of a method 100 of thermal control of a battery or battery assembly. Aspects of the method 100 may be performed by the controller 36 or other suitable processing device. In addition, the method 100 is described in conjunction with the vehicle 10, but is not so limited, as the method 90 may be performed in conjunction with any suitable battery or battery system.

The method 100 includes a number of steps or stages represented by blocks 101-118. The method 100 is not limited to the number or order of steps therein, as some steps represented by blocks 101-118 may be performed in a different order than that described below, or fewer than all of the steps may be performed.

Blocks 103-108 represent a process of applying a current signal pulse and recording the response of the battery assembly 22 and circuit 34. Blocks 109-114 represent calculation of internal temperature to determine whether a heating cycle should be performed. It is noted that blocks 103-114 may be performed as discussed below to trigger a heating cycle. However, the method 100 is not so limited. For example, blocks 103-114 may be performed periodically during a heating cycle, and parameters of the heating cycle (e.g., AC frequency, current magnitude) may be adjusted in real time.

At block 101, the thermal management module 32 is disabled (i.e., the switches 50 and 52 are OFF (open).

At block 102, temperature data is accessed or loaded. The temperature data includes any information (e.g., correlation data, formulas, models, etc.) that can be used to estimate temperature based on parameters of a response to an applied AC current signal. For example, the temperature data includes a resistance vs temperature curve and/or a temperature table (e.g., a LUT).

At block 103, battery properties are measured. For example, the external temperature of the battery assembly 22, the state of charge (SOC) and battery voltage are recorded.

At block 104, generation of an AC signal is commenced by activating the circuit 34. For example, $t_0$ is set to zero, the switch 50 is closed (ON), and a response current $i_L$ is recorded.

At block 105, the current $i_L$ is monitored until the current amplitude is greater than or equal to a selected current amplitude $I_0$. At block 106, when the current amplitude reaches $I_0$, the switch 50 is opened, and the switch 52 is closed after a duration corresponding to a selected pulse width (e.g., 1 ms).

At block 107, the response is recorded until the recording time reaches a selected time period $t_{rec}$, and then the switch 52 is opened and recording is complete (block 108). $t_{rec}$ is selected such that an initial peak and at least one subsequent peak are recorded. For example, the response is recorded by sampling every microsecond (1 μs sampling rate).

At block 109, the recorded response $i_L$ is processed, and response parameters such as $T_0$, $T_d$ and $I_1$ are measured (block 110). At block 111, inductance, resistance and capacitance are calculated as discussed herein.

At block 112, the internal temperature is estimated using, for example, a resistance vs temperature curve and/or a LUT relating resistance and temperature.

The internal temperature is compared to a threshold temperature value corresponding to a desired temperature (block 113). If the internal temperature is at or above the threshold, the method 100 ends (block 114).

If the internal temperature is less than the threshold, the module 32 is used to apply an AC current to the battery assembly 22 to increase the battery temperature.

At block 115, a current magnitude $I_p$ and frequency is selected based on a desired heating rate. The heating cycle commences by applying the AC current with the selected magnitude and frequency (block 116). The AC current is maintained until a preset time limit is met (block 117), and then the heating cycle ends and the module 32 is disabled (block 118). As noted above, the internal temperature can be estimated repeatedly during the heating cycle to monitor the internal temperature.

Figure 8:
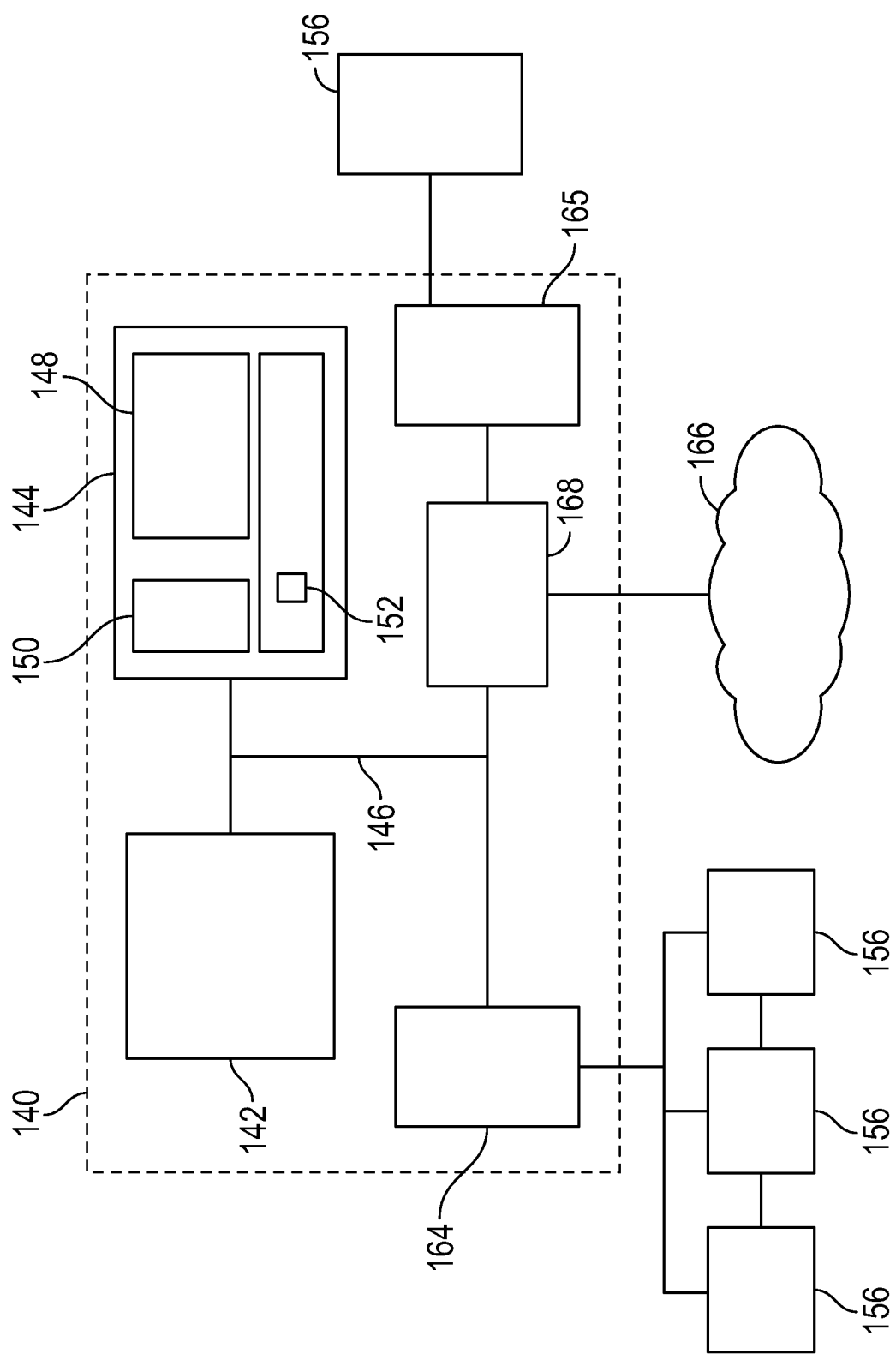
FIG. 8 depicts a computer system in accordance with an exemplary embodiment.

FIG. 8 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions related to controlling heating, temperature measurement and thermal control operations as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 140. Examples include, but are not limited to: microcode, device drivers, redundant processing units, external disk drive arrays, RAID systems, and data archival storage systems, etc.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A device for parameter estimation and thermal control of a battery assembly, comprising:
   a thermal management module electrically connected to the battery assembly, the thermal management module including a circuit configured to generate an alternating current (AC) signal through the battery assembly; and
   a controller configured to estimate an internal temperature of the battery assembly based on a response of the circuit and the battery assembly to the AC signal, the AC signal including at least one pulse having a selected amplitude and a selected pulse width, the response including a first peak having a first amplitude and defined by an initial rise in the current through the battery assembly, and a subsequent second peak having a second amplitude that is lower than the first amplitude, wherein the controller is configured to perform:
   applying the AC signal to the battery assembly via the thermal management module;
   detecting the response;
   calculating one or more response parameters based on the response, the one or more response parameters including a calculated resistance of the battery assembly, the one or more response parameters including at least one of an inductance and a capacitance of the circuit and the battery assembly, wherein the inductance is calculated based on the first amplitude, and the capacitance is calculated based on a time period between the first peak and the second peak; and
   estimating the internal temperature based on the calculated resistance.

2. The device of claim 1, wherein the controller is configured to apply an AC current to the battery assembly to heat the battery assembly to a desired temperature, and control one or more parameters of the AC current based on the estimated internal temperature.

3. The device of claim 1, wherein the circuit is a quasi-resonant circuit including an inductor, a capacitor and a half bridge switch configuration.

4. The device of claim 1, wherein detecting the response includes measuring a voltage and a current as a function of time.

5. The device of claim 1, wherein the AC signal includes a single current pulse.

6. The device of claim 4, wherein the inductance is calculated based on the first amplitude and a rate of increase of the measured current to the first amplitude.

7. The device of claim 1, wherein the internal temperature is based on the calculated resistance and a state of charge of the battery assembly.

8. The device of claim 1, wherein the capacitance is calculated based on the time period between the first peak and the second peak and the inductance.

9. A method of estimating a parameter of a battery assembly and thermally managing the battery assembly, comprising:
   applying an alternating current (AC) signal to the battery assembly via a thermal management module electrically connected to the battery assembly, the thermal management module including a circuit configured to generate the AC signal, the AC signal including at least one pulse having a selected amplitude and a selected pulse width;
   detecting a response of the circuit and the battery assembly to the AC signal, the response including a first peak having a first amplitude and defined by an initial rise in the current through the battery assembly, and a subsequent second peak having a second amplitude that is lower than the first amplitude;
   calculating one or more response parameters, the one or more response parameters including a calculated resistance of the battery assembly, the one or more response parameters including at least one of an inductance and a capacitance of the circuit and the battery assembly, wherein the inductance is calculated based on the first amplitude, and the capacitance is calculated based on a time period between the first peak and the second peak; and
   estimating the internal temperature based on the calculated resistance.

10. The method of claim 9, further comprising applying an AC current to the battery assembly to heat the battery assembly to a desired temperature, and controlling one or more parameters of the AC current based on the estimated internal temperature.

11. The method of claim 9, wherein the circuit is a quasi-resonant circuit including an inductor, a capacitor and a half bridge switch configuration.

12. The method of claim 9, wherein detecting the response includes measuring a voltage and a current as a function of time.

13. The method of claim 9, wherein the AC signal includes a single current pulse.

14. The method of claim 12, wherein the inductance is calculated based on the first amplitude and a rate of increase of the measured current to the first amplitude.

15. The method of claim 9, wherein the internal temperature is based on the calculated resistance and a state of charge of the battery assembly.

16. The method of claim 9, wherein the capacitance is calculated based on the time period between the first peak and the second peak and the inductance.

17. A vehicle system comprising:
   a memory having computer readable instructions; and
   a processing device for executing the computer readable instructions, the computer readable instructions controlling the processing device to perform a method including:

applying an alternating current (AC) signal to the battery assembly via a thermal management module electrically connected to the battery assembly, the thermal management module including a circuit configured to generate the AC signal, the AC signal including at least one pulse having a selected amplitude and a selected pulse width the response includes a first peak having a first amplitude and defined by an initial rise in the current through the battery assembly, and a subsequent second peak having a second amplitude that is lower than the first amplitude;

detecting a response of the circuit and the battery assembly to the AC signal;

calculating one or more response parameters, the one or more response parameters including a calculated resistance of the battery assembly, the one or more response parameters including at least one of an inductance and a capacitance of the circuit and the battery assembly, wherein the inductance is calculated based on the first amplitude, and the capacitance is calculated based on a time period between the first peak and the second peak; and estimating the internal temperature based on the calculated resistance.

18. The vehicle system of claim 17, wherein the method further includes applying an AC current to the battery assembly to heat the battery assembly to a desired temperature, and controlling one or more parameters of the AC current based on the estimated internal temperature.

19. The vehicle system of claim 17, wherein detecting the response includes measuring a voltage and a current as a function of time inductance is calculated based on the first amplitude and a rate of increase of the measured current to the first amplitude.

20. The vehicle system of claim 17, wherein the capacitance is calculated based on the time period between the first peak and the second peak and the inductance.

\* \* \* \* \*